US010020984B1

(12) United States Patent
Jork et al.

(10) Patent No.: US 10,020,984 B1
(45) Date of Patent: Jul. 10, 2018

(54) RSVP LOCAL PROTECTION SIGNALING REDUCTION

(71) Applicant: Juniper Networks, Inc., Sunnyvale, CA (US)

(72) Inventors: Markus Jork, Andover, MA (US); Abhishek Deshmukh, Burlington, MA (US); Alia K. Atlas, Arlington, MA (US); Raveendra Torvi, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 346 days.

(21) Appl. No.: 14/152,164

(22) Filed: Jan. 10, 2014

(51) Int. Cl.
*G01R 31/08* (2006.01)
*H04L 12/24* (2006.01)
*H04L 12/723* (2013.01)

(52) U.S. Cl.
CPC .......... *H04L 41/0668* (2013.01); *H04L 45/50* (2013.01)

(58) Field of Classification Search
CPC ........................... H04L 41/0668; H04L 45/50
See application file for complete search history.

(56) References Cited

U.S. PATENT DOCUMENTS

| 7,184,437 | B1 | 2/2007 | Cole et al. |
| 7,720,061 | B1 | 5/2010 | Krishnaswamy et al. |
| 8,077,726 | B1 | 12/2011 | Kumar et al. |
| 8,165,032 | B1 * | 4/2012 | Hanif .................. H04L 41/0659 370/242 |
| 8,339,959 | B1 * | 12/2012 | Moisand ............. H04L 63/0236 370/235 |
| 2004/0109687 | A1 * | 6/2004 | Park .................... H04J 14/0227 398/57 |
| 2006/0126502 | A1 * | 6/2006 | Vasseur ................... H04L 45/04 370/221 |
| 2006/0153067 | A1 * | 7/2006 | Vasseur ................... H04L 45/02 370/217 |
| 2006/0159009 | A1 * | 7/2006 | Kim ........................ H04L 12/18 370/216 |

(Continued)

OTHER PUBLICATIONS

Berger et al., "RSVP Refresh Overhead Reduction Extensions," Network Working Group, RFC 2961, Apr. 2001, 35 pp.

(Continued)

*Primary Examiner* — Gregory Sefcheck
*Assistant Examiner* — Jael Ulysse
(74) *Attorney, Agent, or Firm* — Shumaker & Sieffert, P.A.

(57) ABSTRACT

In one example, a merge point network device (MP) receives a plurality of resource reservation request messages for establishing a plurality of label switched paths (LSPs), wherein each of the plurality of LSPs has a common point of local repair network device (PLR) and has the MP as a common MP, wherein each of the resource reservation request messages identifies a common bypass tunnel that extends between the PLR and the MP and avoids a protected resource. The MP stores an association between the bypass tunnel and each of the plurality of LSPs. The MP receives a single message to trigger creation at the merge point network device of backup LSP state information for all of the plurality of LSPs. In response to receiving the single message, the MP installs state information for all of the LSPs that correspond to the bypass tunnel according to the stored association.

20 Claims, 5 Drawing Sheets

(56) References Cited

U.S. PATENT DOCUMENTS

| | | | | |
|---|---|---|---|---|
| 2007/0011284 A1* | 1/2007 | Le Roux | ............. | H04L 12/5695 709/223 |
| 2008/0019266 A1* | 1/2008 | Liu | ........................ | H04L 45/00 370/228 |
| 2008/0170493 A1* | 7/2008 | Vasseur | .................... | H04L 45/00 370/217 |
| 2008/0304494 A1* | 12/2008 | Yokoyama | ............ | H04W 48/02 370/400 |
| 2009/0080326 A1* | 3/2009 | Xu | ........................ | H04L 45/00 370/225 |
| 2009/0185478 A1* | 7/2009 | Zhang | ................ | H04L 12/5695 370/216 |
| 2009/0225650 A1* | 9/2009 | Vasseur | ............... | H04L 41/0668 370/218 |
| 2009/0262651 A1* | 10/2009 | Liu | ..................... | H04L 43/0823 370/242 |
| 2009/0292942 A1* | 11/2009 | Bhat | ................... | H04L 41/0668 714/4.1 |
| 2009/0292943 A1* | 11/2009 | Hanif | ..................... | H04L 45/00 714/4.1 |
| 2010/0106999 A1* | 4/2010 | Hanif | ................. | H04L 41/0668 714/4.1 |
| 2010/0208584 A1* | 8/2010 | Sone | ....................... | H04L 45/00 370/228 |
| 2010/0296412 A1* | 11/2010 | Yang | ....................... | H04L 45/22 370/254 |
| 2011/0090786 A1* | 4/2011 | Liu | ..................... | H04L 12/5695 370/221 |
| 2013/0089100 A1* | 4/2013 | Zhao | ....................... | H04L 45/28 370/395.5 |
| 2013/0208582 A1* | 8/2013 | Wijnands | .............. | H04L 49/552 370/218 |
| 2013/0336191 A1* | 12/2013 | Zhao | ................... | H04L 12/1863 370/312 |
| 2013/0336192 A1* | 12/2013 | Zhao | ....................... | H04L 45/16 370/312 |
| 2014/0029418 A1* | 1/2014 | Jain | ..................... | H04L 41/0668 370/228 |
| 2014/0064062 A1* | 3/2014 | Taillon | .................... | H04L 45/22 370/225 |
| 2014/0280711 A1* | 9/2014 | Asati | ....................... | H04L 67/10 709/217 |

OTHER PUBLICATIONS

Pan et al., "Fast Reroute Extensions to RSVP-TE for LSP Tunnels," Network Working Group, RFC 4090, May 2005, 39 pp.

\* cited by examiner

RSVP LOCAL PROTECTION SIGNALING REDUCTION

TECHNICAL FIELD

The disclosure relates to packet-based computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as the Border Gateway Protocol (BGP).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS). A packet may be a formatted set of data.

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System-Intermediate System (ISIS) protocol or the Open Shortest Path First (OSPF) protocol.

Head-end routers of an LSP are commonly known as ingress routers, while routers at the tail-end of the LSP are commonly known as egress routers. Ingress and egress routers, as well as intermediate routers along the LSP that support MPLS, are referred to generally as label switching routers (LSRs). A set of packets to be forwarded along the LSP is referred to as a forwarding equivalence class (FEC). A plurality of FECs may exist for each LSP, although there may, in some examples, be only one active LSP for any given FEC. Typically, a FEC definition includes the IP address of the destination of the LSP, e.g., an IP address assigned to the egress router of the LSP. In general, each router along the LSP maintains a context that associates a FEC with an incoming label and an outgoing label. The ingress label edge router (LER) uses routing information, propagated from the egress LER, to determine the LSP, to assign labels for the LSP, and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, the LSR performs a lookup in the context and swaps the MPLS label according to the information in its forwarding table based on the lookup and forwards the packet to the appropriate downstream LSR or LER. The egress LER removes the label from the packet and forwards the packet to its destination in accordance with non-label based packet forwarding techniques.

SUMMARY

In general, this disclosure describes techniques for simplifying setup of backup LSPs along a common bypass tunnel between a point of local repair (PLR) router and a merge point (MP) router, where the bypass tunnel is used for fast reroute of each of a plurality of protected LSPs. This disclosure describes enabling use of a bypass tunnel or protection path to minimize signaling at time of failure by first sending information for protection state for each protected LSP at the MP router, and confirming by the PLR router that the message information has been received and understood by the MP router. In response to detecting a failure of a protected resource, the PLR router then sends a single message to cause the MP router to create the state for each protected LSP using the previously sent information. In accordance with the techniques of this disclosure, the PLR router assigns a bypass tunnel identifier to each bypass tunnel that the PLR router creates, which the PLR router sends to the MP router to facilitate this process.

In some examples, when sending Path messages for setting up LSPs that are protected by a bypass tunnel, the PLR router includes within each Path message a new signaling object that specifies the bypass tunnel identifier of the bypass tunnel over which the LSP traffic will be rerouted in case of failure. Upon receiving the Path message having the new signaling object, the MP router stores a mapping between the LSP being established and the bypass tunnel identifier. This allows the PLR router to later, when a failure occurs, send only one Path message for triggering creation of backup LSP state over the bypass tunnel. The single Path message also includes the assigned bypass tunnel identifier. In response to receiving this single Path message over the bypass tunnel, the MP determines the bypass tunnel identifier specified by the Path message, and automatically creates state for each of the backup LSPs. By sending a single RSVP Path message on the bypass tunnel that refers to the earlier-advertised bypass tunnel identifier, the network can avoid sending a surge of RSVP Path and Resv messages immediately after link failure. This can also facilitate streamlined setup of summary refresh of the backup LSP state over the bypass tunnel.

In one example, a method includes outputting, by a point of local repair network device, a plurality of resource reservation request messages for establishing a plurality of label switched paths (LSPs) between the point of local repair network device and a common merge point network device, wherein each of the resource reservation request messages identifies a common bypass tunnel that extends between the point of local repair network device and the merge point network device and avoids a protected resource, and, by the point of local repair network device, detecting failure of the protected resource along the plurality of LSPs between the point of local repair network device and the merge point network device. The method also includes, in response to detecting the failure, and by the point of local repair network device, outputting a single message to the merge point network device to trigger creation at the merge point network device of backup LSP state information for all of the plurality of LSPs.

In another example, a method includes receiving, by a merge point network device, a plurality of resource reservation request messages for establishing a plurality of LSPs between a common point of local repair network device and the merge point network device, wherein each of the resource reservation request messages identifies a common bypass tunnel that extends between the point of local repair network device and the merge point network device and avoids a protected resource, and, in response to receiving the plurality of resource reservation request messages, storing, by the merge point network device, an association between the bypass tunnel and each of the plurality of LSPs. The method also includes receiving, by the merge point network device, a single message to trigger creation of backup LSP state information for the protected LSPs, and, in response to receiving the single message, automatically creating, by the merge point network device, backup LSP state information for each of the plurality of LSPs that corresponds to the bypass tunnel according to the stored association.

In another example aspect, a point of local repair network device includes a hardware-based processor, and a Resource Reservation Protocol with Traffic Engineering extensions (RSVP-TE) module executing on the hardware-based processor, wherein the RSVP-TE module outputs a plurality of resource reservation request messages for establishing a plurality of label switched paths (LSPs) between the point of local repair network device and a common merge point network device, wherein each of the resource reservation request messages identifies a common bypass tunnel that extends between the point of local repair network device and the merge point network device and avoids a protected resource. The point of local repair network device also includes a connectivity fault detection module that detects failure of the protected resource along the plurality of LSPs between the point of local repair network device and the merge point network device, wherein in response to detecting the failure, the RSVP-TE module outputs a single message to the merge point network device to trigger creation of backup LSP state information at the merge point network device for all of the plurality of LSPs.

In yet another example aspect, a merge point network device includes a hardware-based processor, and a RSVP-TE module executing on the hardware-based processor, wherein the RSVP-TE module receives a plurality of resource reservation request messages for establishing a plurality of LSPs between a common point of local repair network device and the merge point network device, wherein each of the resource reservation request messages identifies a common bypass tunnel that extends between the point of local repair network device and the merge point network device and avoids a protected resource, wherein the RSVP-TE module stores an association between the bypass tunnel and each of the plurality of LSPs, and outputs a single message to the merge point network device to trigger creation at the merge point network device of backup LSP state information for all of the plurality of LSPs, and wherein, in response to receiving the single message, the RSVP-TE module creates backup LSP state information for each of the plurality of LSPs that corresponds to the bypass tunnel according to the stored association.

In a further example aspect, a computer-readable storage medium includes instructions for causing a programmable processor to output a plurality of first resource reservation request messages for establishing a plurality of label switched paths (LSPs) between the point of local repair network device and a common merge point network device, wherein each of the resource reservation request messages identifies a common bypass tunnel that extends between the point of local repair network device and the merge point network device and avoids a protected resource, detect failure of the protected resource along the plurality of LSPs between the point of local repair network device and the merge point network device, and, in response to detecting the failure, output a single message to the merge point network device to trigger creation at the merge point network device of backup LSP state information for all of the plurality of LSPs.

The techniques of this disclosure may provide one or more advantages. For example, The techniques of this disclosure provide a solution that reduces or avoids the need to send RSVP trigger messages for all of the backup LSPs through a bypass tunnel, and thus makes it possible to scale to a higher number of protected LSPs using a given bypass tunnel. By sending a single RSVP Path message on the bypass tunnel that refers to the earlier-advertised bypass tunnel identifier, the network can avoid sending a surge of RSVP Path and Resv messages immediately after link failure.

The techniques of this disclosure also mean that the PLR router does not need to signal the Backup LSPs ahead of time, which may avoid redundant work and an unnecessary increase in the number of LSPs to be maintained. The techniques of this disclosure can also enable customers to make use of default RSVP refresh timers, thus avoiding a need to increase the RSVP default refresh time. Increasing the RSVP default refresh time can result in longer delays in re-synchronizing state if some RSVP update messages are lost, and may not be an acceptable solution to all customers.

The details of one or more examples are set forth in the accompanying drawings and the description below. Other features, objects, and advantages will be apparent from the description and drawings, and from the claims.

DETAILED DESCRIPTION

Figure 1:
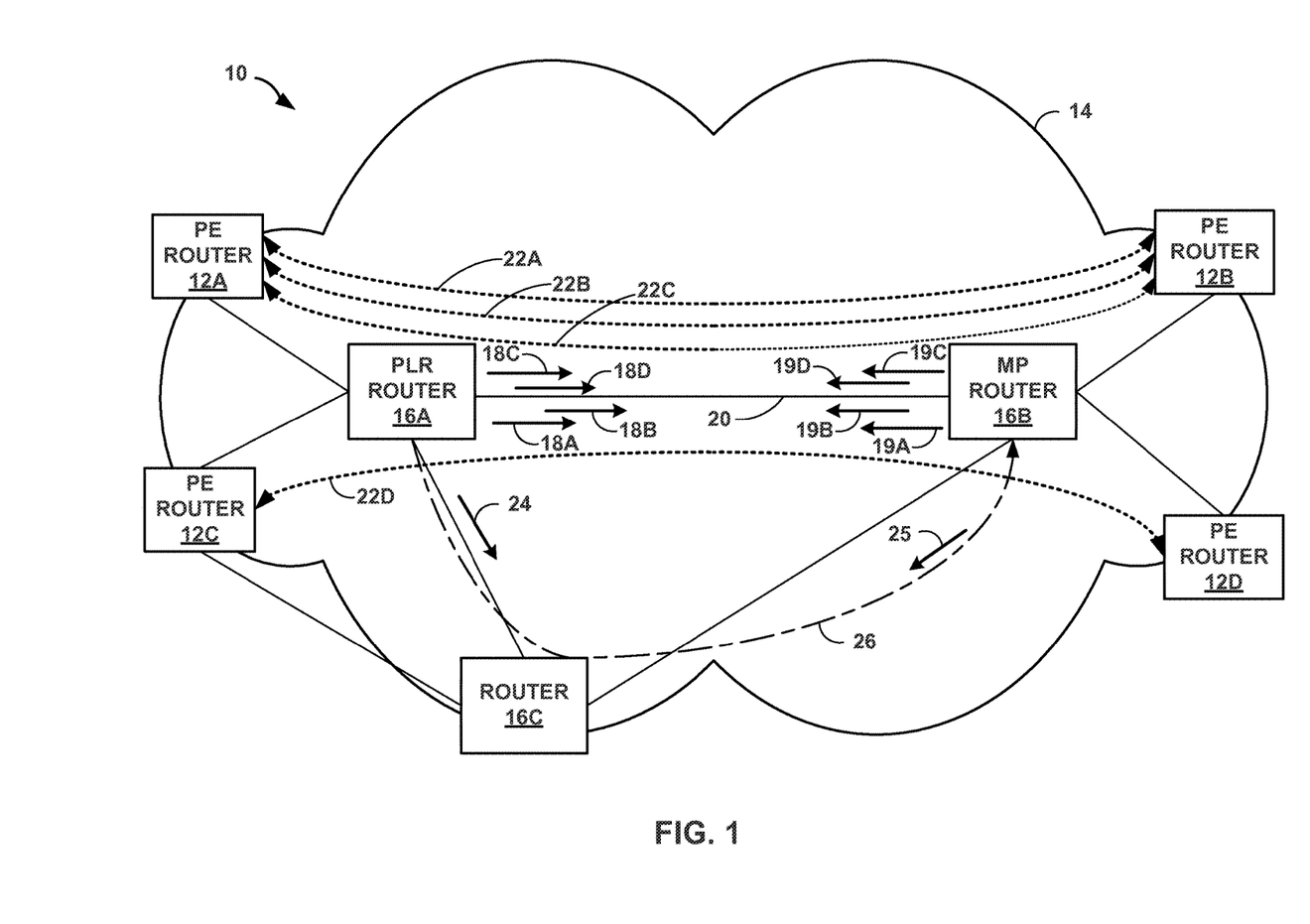
FIG. 1 is a block diagram illustrating an example system in which routers are configured to forward network traffic in accordance with the techniques of this disclosure.

FIG. 1 is a block diagram illustrating an example network system 10 in which provider edge (PE) routers 12A-12D ("PE routers 12") and routers 16A-16C ("routers 16") of network 14 are configured to forward network traffic (e.g., network packets) in accordance with the techniques of this disclosure. In the example of FIG. 1, router 16A is a point of local repair (PLR) router along the path of each of label switched paths (LSPs) 22A-22D ("LSPs 22"). In the example of FIG. 1, PLR router 16A is a transit router, i.e., an intermediate router along LSPs 22 and is neither an ingress router nor an egress router of the LSPs. In this example, PE router 12A is the ingress router of LSPs 22A, 22B, and 22C, and PE router 12B is the egress router of LSPs 22A, 22B, and 22C. PE router 12C is the ingress router of LSP 22D, and PE router 12D is the egress router of LSP 22D. Each of LSPs 22 extends along respective paths that pass through PLR router 16A, link 20, and router 16B.

PE routers 12 and routers 16 represent any network device that routes or otherwise forwards traffic through network 14. Typically, routers 12, 16 represent a L3 packet-switching device that operates at L3 to exchange routing information using a routing protocol, such as an Interior Gateway Protocol (IGP), describing a current topology of network 14. Routers 12, 16 then process this routing information, selecting paths through its representation of the topology of network 14 to reach all available destinations to generate forwarding information. In other words, routers 12, 16 reduce these paths to so-called "next hops" which identify interfaces to which to forward traffic destined for a particular destination, where the forwarding information includes this list of next hops. Routers 12, 16 then install this forwarding information in a forwarding plane of the router, whereupon the forwarding plane forwards received traffic in accordance with the forwarding information.

PLR router 16A may have previously computed and signaled bypass tunnel 26 as a backup path for protecting link 20, such as by using the Resource Reservation Protocol with Traffic Engineering extensions (RSVP-TE). PLR router 16A is the point of local repair (PLR) for bypass tunnel 26, and router 16B is the merge point (MP) for bypass tunnel 26. Bypass tunnel 26 is a tunnel that provides link protection for link 20 between router 16A and router 16B, such that if link 20 should fail, PLR router 16A can establish a backup LSP over bypass tunnel 26 and send the network traffic received along an existing LSP through the backup LSP. Router 16A may establish bypass tunnel 26 in accordance with MPLS fast reroute techniques, as described in P. Pan, "Fast Reroute Extensions to RSVP-TE for LSP Tunnels," Network Working Group RFC 4090, May 2005, the entire contents of which are incorporated by reference herein.

For example, as the point of local repair (PLR) and ingress of bypass tunnel 26, router 16A may establish bypass tunnel 26 to protect one or more other existing LSPs (such as LSPs 22) that traverse at least router 16A and router 16B and do not traverse router 16C. In some examples, router 16A may establish bypass tunnel 26 upon request by an ingress router of one of these protected LSPs 22. For example, router 16A may receive an RSVP-TE PATH request from ingress PE router 12A that includes a fast reroute object in which a "local protection desired" flag, or other fast reroute flag, is set. After router 16A establishes bypass tunnel 26, router 16A maintains forwarding information in a data plane of router 16A that allows router 16A to send traffic through bypass tunnel 26 if link 20 fails.

Responsive to detecting a failed resource between PLR router 16A and MP router 16B (e.g., failure of link 20, in the example of FIG. 1), PLR router 16A may perform a soft reroute action to reroute the traffic LSPs 22 onto a previously-established bypass tunnel 26. For example, PLR router 16A may update its stored forwarding state to change the primary next hops for LSPs 22, such as by setting a next hop for bypass tunnel 26 as the primary next hop for traffic received for LSPs 22.

In some examples, network 14 may be a service provider network. For example, network 14 may represent one or more networks owned and operated by a service provider (which is commonly a private entity) that offer one or more services for consumption by subscriber networks. In this context, network 14 is typically a layer three (L3) packet-switched network that provides L3 connectivity between a public network and one or more subscriber networks (not shown). Often, this L3 connectivity provided by a service provider network is marketed as a data service or Internet service, and subscribers may subscribe to this data service. Network 14 may represent a L3 packet-switched network that provides data, voice, television and any other type of service for purchase by subscribers and subsequent consumption by subscriber networks.

While not shown in the example of FIG. 1, network system 10 may include additional service provider networks, subscriber networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to subscriber networks.

RFC 4090 describes a facility backup method which provides link or node protection by pre-calculating a bypass path for the set of LSPs traversing a link. See P. Pan, "Fast Reroute Extensions to RSVP-TE for LSPs," Network Working Group RFC 4090, May 2005, the entire contents of which are incorporated by reference herein. Upon link failure, PLR router 16A redirects traffic over bypass tunnel 26 via a backup LSP from PLR router 16A to MP router 16B. Because of the soft-state nature of RSVP, PLR router 16A is also expected to signal the backup LSPs along the bypass tunnel 26 towards MP router 16B. These backup LSPs help in maintaining state across PLR router 16A and MP router 16B.

Although shown in FIG. 1 for purposes of example as having four LSPs 22, there may be many more than four LSPs in network 14 established through PLR router 16A and MP router 16B. Consider a setup where a large number of protected LSPs 22 are using the same primary link 20. All these LSPs will then use the same bypass tunnel 26. When local protection is in use and a failure of a protected resource occurs (e.g., link 20 goes down), conventionally PLR router 16A would need to signal a new backup LSPs across bypass tunnel 26 for each of the protected LSPs 22 via RSVP Backup Path messages. This signaling of backup LSPs is required at a critical time when there is already a lot of churn in network 14. In this scenario, PLR router 16A would waste a lot of important cycles in signaling these backup Path messages. PLR router 16A will also be receiving a large number of RESV messages on the backup tunnel 26 from MP router 16B. Some of the backup PATH messages may get lost or PLR router 16A might not be able to signal all the backup PATH messages before state timeouts at MP router 16B. For example, after a link failure, if MP router 16B does not receive a Backup Path message within 3*REFRESH_TIME, then Path state is timed out at MP router 16B. It results in MP router 16B sending a PathTear downstream. If backup Path message signaled by PLR router 16A reaches after this Path timeout at MP router 16B, then MP router 16B may interpret the Path message as being for a new LSP because MP router 16B cannot correlate the Path message to any existing protected LSP 22, and MP router 16B will signal the Path message towards the egress device.

The techniques of this disclosure provide a solution that reduces or avoids the need to send RSVP trigger messages for all of the backup LSPs through bypass tunnel 26, and thus makes it possible to scale to a higher number of protected LSPs using bypass tunnel 26. In accordance with the techniques of this disclosure, PLR router 16A will assign an identifier to each bypass tunnel that PLR router 16A creates. PLR router 16A will include a new signaling object "BypassInfo" in the Path message of every protected LSP.

The BypassInfo signaling object identifies the bypass tunnel used for protecting the LSP and makes that information known to the merge point (MP). For example, PLR router 16A sends a plurality of resource reservation request messages (e.g., RSVP-TE Path messages) 18A-18D ("Path messages 18") corresponding to respective LSPs 22A-22D, for establishing the LSPs 22.

The MP is usually one or two hops downstream of the PLR router 16A, and so the signaling object containing the bypass tunnel identifier includes a mechanism to discard the information from the Path message once it goes beyond the MP (e.g. a TTL value or explicit identification of the intended MP). The intended MP will remove this new signaling object from PATH message, because this signaling object is of no interest to nodes further downstream. The signaling object identifies the PLR that created the signaling object and the intended MP for the signaling object. That ensures that the (PLR, MP, bypass tunnel identifier) tuple is a unique identifier in the network. To this end, the "BypassInfo" object may contain, for example, a bypass tunnel identifier, which is a value for identifying the bypass tunnel associated with the protected LSP; a PLR ID, which is a Router ID of the PLR so that the MP can identify the PLR correctly; and MP ID, which is a Router ID of the MP so that the new signaling object is processed at the correct MP.

MP router 16B should send an acknowledgement message (ACK) to the PLR router 16A to indicate that MP router 16B has received and processed the BypassInfo object. So, upon receipt of this new signaling object in the Path message, MP router 16B will include a new signaling object "BypassInfoACK" in a resource reservation reply message (e.g., an RSVP-TE Resv message). For example, MP router 16B sends Resv messages 19A-19D ("Resv messages 19"), in response to the respective Path message 18A-18D received from PLR router 16A. The "BypassInfoACK" signaling object will contain the (PLR, MP, Bypass Tunnel Identifier) tuple, i.e., Bypass Tunnel Identifier value, PLR ID-Router ID of PLR, and MP ID-Router ID of MP. PLR router 16A determines that MP router 16B has received and processed the bypass info signaling object when PLR router 16A receives a corresponding signaling object back in the Resv message 19.

When link failure happens, PLR router 16A will send a new object "BypassInUse" in a message to MP router 16B. Now when a failure occurs and the bypass tunnel comes into use, PLR router 16A will notify MP router 16B by sending a BypassInUse signaling object which includes the bypass tunnel identifier value. In accordance with the techniques of this disclosure, PLR router 16A may send a single bypass Path message 24 to MP router 16B with the BypassInUse signaling object, instead of sending multiple (one for each protected LSP) trigger backup Path messages through the bypass tunnel 26. MP router 16B can now use the bypass tunnel identifier as the trigger for causing MP router 16B to create the backup LSP state for all of the protected LSPs. In response to receiving the single bypass Path message 24, for each protected LSP with a matching bypass tunnel identifier, MP router 16B will create the backup state as if MP router 16B had received a Path message for the backup LSP through the bypass tunnel.

PLR router 16A can send the BypassInUse signaling object to MP router 16B in various ways. In some examples, PLR router 16A may add the BypassInUse signaling object to the signaling of bypass tunnel 26, e.g., by including the BypassInUse signaling object within a Path message that PLR router 16A sends to MP router 16B for maintaining/refreshing bypass tunnel 26. In this example, the existing bypass Path message sent from PLR router 16A to router 16C to MP router 16B (which needs to be periodically sent to maintain bypass tunnel 26) is used by PLR router 16A as a transport vehicle for sending the BypassInUse signaling object. In other examples, PLR router 16A includes the BypassInUse signaling object as part of some message sent "over" bypass tunnel 26, i.e., the BypassInUse signaling object is transparent to router 16C. In this case, for example, the message may be prepended with the MPLS label assigned for bypass tunnel 26, and this could be a new RSVP signaling message type. In either example, PLR router 16A sends a single message to MP router 16B to trigger MP router 16B to establish all of the needed backup LSP state on MP router 16B.

At the time of failure, for the LSPs which are missing acknowledgment from MP router 16B of the bypass information signaling object, PLR router 16A will continue to send backup Path messages to trigger MP router 16B as normal. This will ensure correct behavior in cases where MP router 16B is not supporting this new functionality, or if MP router 16B has not correctly processed the new signaling object.

On receiving the single Path message with the BypassInUse signaling object, MP router 16B will start the creation of backup LSP state. MP router 16B will create the backup state for each protected LSP with matching bypass tunnel identifier. MP router 16B will also send to PLR router 16A a single Resv message 25 having a BypassInUse Acknowledgement signaling object 25, in response to the received single Path message, as part of bypass tunnel signaling. At the time of link failure, if PLR router 16A has not received "BypassInfoAck" object for some LSPs, then PLR router 16A will continue to trigger Backup Path messages for those LSPs.

The techniques of this disclosure also provide a mechanism to extend the refresh reduction capabilities for backup LSPs. Because of the soft-state nature of RSVP, PLR router 16A and MP router 16B will eventually need to resume the standard RSVP refresh behavior and exchange Path and Resv messages for the backup LSPs. To reduce the overhead of that, the techniques of this disclosure further include a mechanism to bootstrap refresh reduction functionality between PLR router 16A and MP router 16B. Refresh reduction functionality is described in L. Berger, "RSVP Refresh Overhead Reduction Extensions," Network Working Group RFC 2961, April 2001, the entire contents of which are incorporated by reference herein. The refresh reduction functionality aspect of this disclosure has the goal to make backup message IDs available for the Path and Resv state so that PLR router 16A never has to send the actual individual trigger Path and Resv messages over bypass tunnel 26. For the Path state, this goal is achieved by including a backup message-ID along with the bypass tunnel identifier in the same signaling object in the initial protected LSP Path message 18 sent by PLR router 16A over the primary path. Doing so enables MP router 16B to learn about the message-ID to put in the backup LSP state that MP router 16B later automatically creates for PLR router 16A.

MP router 16B can likewise include a respective BackupResv Message-ID in the respective BypassInfoAck Objects of the Resv messages 19 sent by MP router 16B over the primary path when establishing LSPs 22. For establishing Resv state message-IDs, MP router 16B includes Resv message-IDs for the protected LSPs in the new signaling object contained in the Resv messages 19. Pre-sending these message-IDs allow the MP router 16B and PLR router 16A to store the message-IDs, allowing them to identify the message-IDs that are received in later-sent summary refresh messages, and be able to appropriately process the summary refresh messages.

There can be more than one such bypass tunnel identifier because MP router 16B may be a MP for more than one upstream PLR. This Resv bypass info ack signaling object explicitly identifies the PLR that the message is targeting and will not be propagated in Resv messages beyond (upstream from) the PLR. The Resv bypass info ack signaling object includes the message-ID to be used for the backup Resv message (from MP to PLR) corresponding to the protected LSP.

This a-priori establishment of message-IDs enables the following mechanism to synchronize and maintain the backup LSP state between PLR and MP: after the initial single Path message subsequently sent across the bypass tunnel 26 from PLR router 16A to MP router 16B which establishes the backup LSPs, both PLR router 16A and MP router 16B send Summary refresh messages to each other containing a list of the pre-assigned message-IDs. Any differences between PLR router 16A and MP router 16B views of what backup LSPs should exist can be resolved by the MESSAGE_ID_ACK and MESSAGE_ID_NACK mechanism described in RFC 2961.

In response to determining that the failed resource (e.g., link 20) has come back up, PLR router 16A will no longer include the new bypass information signaling object in the bypass Path message, and PLR router 16A will stop sending summary refresh messages corresponding to the backup LSPs. MP router 16B will then in turn also stop sending summary refresh messages corresponding to the backup LSPs.

Figure 2:
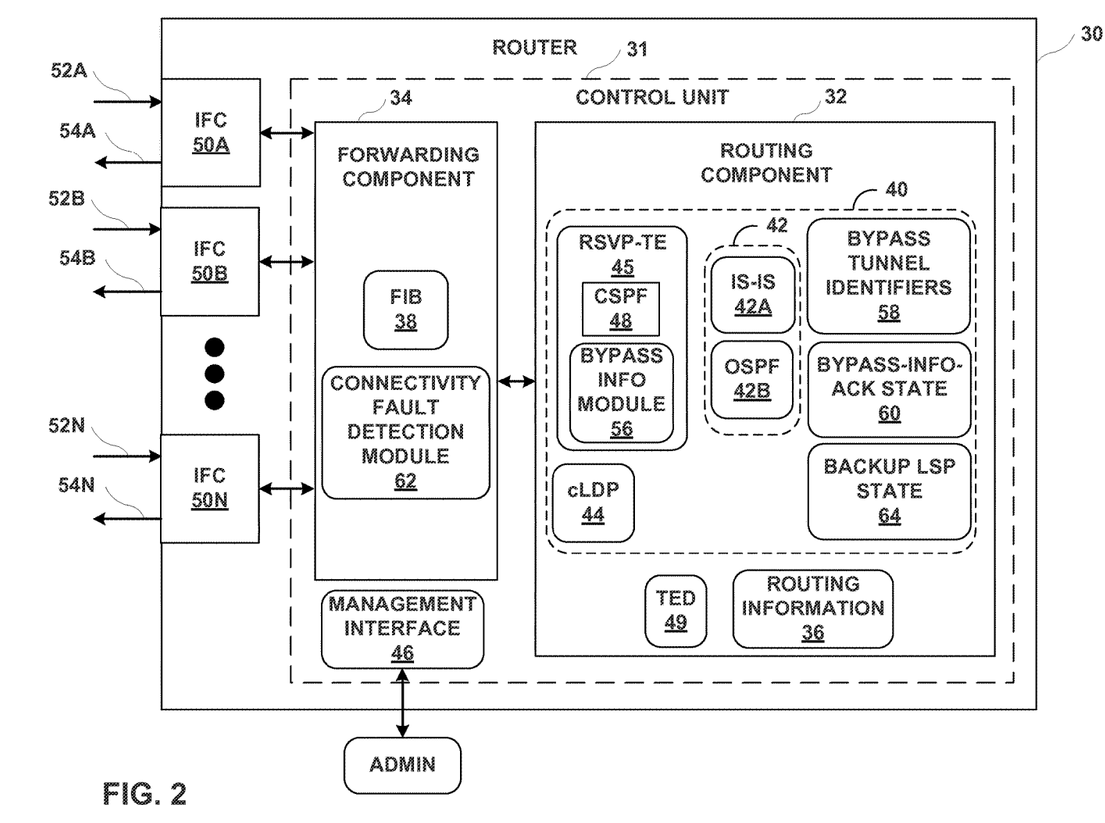
FIG. 2 is a block diagram illustrating an example embodiment of a point of local repair (PLR) network device in accordance with the techniques of this disclosure.

FIG. 2 is a block diagram illustrating an example embodiment of a point of local repair (PLR) network device in accordance with the techniques of this disclosure. PLR router 30 may, for example, represent any of routers 12 or 16 of FIG. 1, such as PLR router 16A, for example. In this example, PLR router 30 includes a control unit 31 that comprises a routing component 32 and a forwarding component 34. In addition, PLR router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing component 32 primarily provides an operating environment for control plane protocols 40. For example, one or more IGP routing protocols 42, such as Intermediate System to Intermediate System (ISIS) routing protocol 42A, or the Open Shortest Path First (OSPF) routing protocol 42B, maintain routing information 36 to reflect the current topology of a network and other network entities to which PLR router 30 is connected. In particular, IGPs 42 update routing information 36 to accurately reflect the topology of the network and other entities. PLR router 30 may include other example routing protocols such as Border Gateway Protocol (BGP).

Routing component 32 generates and programs forwarding component 34 with FIB 38 that associates network destinations with specific next hops and corresponding interfaces ports of IFCs 50 in accordance with routing information 36. Routing component 32 may generate FIB 38 in the form of a radix tree having leaf nodes that represent destinations within the network, for example.

Based on FIB 38, forwarding component 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 34 is a rich and dynamic shared forwarding plane, optionally distributed over a multi-chassis router. Moreover, forwarding component 34 may be provided by dedicated forwarding integrated circuits normally associated with high-end routing components of a network router. Further details of one example embodiment of PLR router 30 can be found in U.S. Pat. No. 8,339,959, issued Dec. 25, 2012, entitled "STREAMLINED PACKET FORWARDING USING DYNAMIC FILTERS FOR ROUTING AND SECURITY IN A SHARED FORWARDING PLANE," the entire contents of which are incorporated herein by reference.

As shown in FIG. 2, protocols 40 executing within routing component 32 includes one or more MPLS protocols for establishing a LSP, which may be accumulated by IGPs 42. For example, RSVP-TE 45 may generate and maintain a traffic engineering database 49, including bandwidth reservations for paths associated with MPLS LSPs. Constrained Shortest Path First (CSPF) process 48 computes a shortest path or paths for an MPLS LSP based on specified constraints and bandwidth availability information associated with the links within the network. IGPs 42 may, in turn, advertise the calculated bandwidth availability information in traffic engineering database (TED) 49 to other peer routers. As another example, constrained Label Distribution Protocol (CR-LDP) 44 may send and receive label mapping messages for establishing a LSP.

PLR router 30 receives RSVP-TE Path messages from PE routers 12A and 12C for setting up LSPs 22A and 22B, respectively. In response, RSVP-TE module 45 of router 30 forwards the RSVP-TE Path messages to router 16B, and also sends RSVP-TE Resv messages back to the ingress routers confirming the reservation of the requested bandwidth. RSVP-TE module 45 may also inform IGPs 42, which in turn can update TED 49 with current available bandwidth information. IGPs 42 may also forward the updated current available bandwidth information to other IGP peers. RSVP-TE module 45 may also store MPLS labels to FIB 38 for LSPs 22A and 22B.

Subsequent to LSPs 22 being established, PLR router 30 may in some examples detect a failure condition of a link, such as link 20 (FIG. 1). For example, connectivity fault detection module 62 may run a session on link 20, and can detect when link 20 fails. In some examples, the link 20 is managed by the kernel of router 30, and the routing protocol daemon (RPD) and/or RSVP-TE module 45 is informed by the kernel if there is any change. RSVP-TE module 45 will react depending on its configuration. In the example of a one-hop session (IGP) at a transit router adjacent to the failed link, then a Periodic Packet Management Daemon (PPMD) (not shown) of routing component 32 may delegate connectivity fault detection functionality to a forwarding component monitor module (e.g., pfemon). Otherwise, routing component 32 may do fault detection. Example techniques for connectivity fault detection in a multi-chassis routing system are described in U.S. Pat. No. 7,720,061, filed Aug. 18, 2006, entitled "Distributed Solution for Managing Periodic Communications in a Multi-Chassis Routing System," the entire contents of which are incorporated by reference herein. In some examples, in response to detecting a failure condition of a protected resource between PLR router 30 and a merge point router, connectivity fault detection module 62 informs RSVP module 45 in the control plane of router 30 of the detected condition. In other examples, connectivity fault detection module 62 may detect a node failure condition, such as where an intermediate router is present on the path between the PLR router 30 and a merge point router.

Although illustrated for purposes of example as being positioned in the forwarding component 34 (e.g., in the forwarding plane of PLR router 30), connectivity fault detection module 62 could alternatively be located in the control plane of PLR router 30, such as within routing component 32. In the case of connectivity fault detection module 62 being located in the control plane, connectivity fault detection module 62 may poll the forwarding component 34 for statistics and information, and compare the data received from forwarding component 34 to configured thresholds, for example. In one example, connectivity fault detection module 62 may comprise a software application programming interface (API) in the control plane of PLR router 30 that notifies notify the control plane of the status of aspects of forwarding component 34, such as next hop utilization statistics, and forwarding component 34 responds by providing the requested statistics. In this case, connectivity fault detection module 62 might perform bookkeeping/accounting of bandwidth in the control plane, for example.

In accordance with the techniques of this disclosure, RSVP-TE module 45 operates in accordance with an RSVP-TE protocol that has been extended to include features for simplifying setup of backup LSPs along a common bypass tunnel between PLR router 30 and a merge point (MP) router, where the bypass tunnel is used for fast reroute of each of a plurality of protected LSPs. RSVP-TE module 45 includes bypass info module 56, which assigns a bypass tunnel identifier to each bypass tunnel created by RSVP-TE module 45. Bypass info module 56 selects the bypass tunnel identifiers in a manner such that a change in bypass LSPs does not requiring sending a new identifier in trigger Path messages for all affected primary LSPs. When there is a need to re-route the bypass tunnel due to changes in the network, the new bypass tunnel taking the new path should still have the same identifier as before. The idea is to have a somewhat persistent identifier for a bypass tunnel protecting a particular link (or node). This may avoid churn when signaling the protected LSPs. In this manner, the identifier for a bypass tunnel protecting a particular resource (link or node) remains the same even as the bypass tunnel's instantiation changes over time to adapt to network conditions. Bypass info module 56 can use an algorithm for selecting the identifier of the bypass tunnel used by primary LSPs such that as the bypass tunnel is changed and rerouted, the identifier does not change, and thus the primary LSPs do not need to be re-signaled with a different identifier. For example, the identifier can be tied to the particular resource (link or node) whose failure is being protected against.

RSVP-TE module 45 stores the mapping of bypass tunnel identifiers to bypass tunnels (and protected LSPs) to bypass tunnel identifiers 58. There may be multiple bypass tunnel identifiers assigned to multiple different bypass tunnels for which PLR router 30 is a PLR. When sending the Path messages for setting up LSPs that are protected by the bypass tunnel, bypass info module 56 includes within each Path message a bypass information signaling object that specifies the assigned bypass tunnel identifier of the bypass tunnel over which the LSP traffic will be rerouted in case of failure. The bypass information signaling object also may specify a PLR ID of PLR router 30, and an MP ID of the MP that is the egress of the bypass tunnel. In some examples, the bypass information signaling object also includes a message-ID assigned to the LSP for backup Path state. As described below with respect to FIG. 3, the MP router that receives the Path messages having the bypass information signaling object will store state associating the LSPs for which the Path messages are being sent with the bypass tunnel identifier, and may store the message-IDs for later use.

RSVP-TE module 45 of PLR router 30 receives a Resv message from the MP router with a bypass information acknowledgement signaling object. In some examples, RSVP-TE module 45 may similarly check the PLR ID of the received bypass information acknowledgement signaling object to determine whether the PLR ID corresponds to PLR module 30. In some examples, the bypass information acknowledgement signaling object also includes a message-ID assigned to the LSP for backup Resv state. RSVP-TE module 45 stores the label mapping information from the received Resv message in FIB 38, and stores bypass-info-ack state 60 indicating which LSPs have received the bypass information acknowledgement signaling object, and may store the message-IDs for later use.

Subsequently, when connectivity fault detection module 62 determines that a protected resource has failed, connectivity fault detection module 62 can notify RSVP-TE module 45. After detecting failure of a protected resource, RSVP-TE module 45 of PLR router 30 may also update FIB 38 to set a next hop to router 16C along bypass tunnel 26 as the primary next hop, such as by changing weights associated with the next hops in the forwarding information. In some examples, PLR router 30 may also then delete the next hop along link 20 from the forwarding state. Examples of updating forwarding state for fast reroute are described in U.S. Pat. No. 8,077,726, entitled, "FAST REROUTE FOR MULTIPLE LABEL SWITCHED PATHS SHARING A SINGLE INTERFACE," issued Dec. 13, 2011, the entire contents of which are incorporated by reference herein.

Also in response to connectivity fault detection module 62 notifying RSVP-TE module 45 of the failure, bypass info module 56 can send a single message for triggering creation of backup LSP state for each of the LSPs 22 over the bypass tunnel (e.g., a Path message for signaling the bypass tunnel). The single message also includes the assigned bypass tunnel identifier. In response to receiving a single message included as part of the bypass tunnel signaling, for example, the MP determines the bypass tunnel identifier specified by the message, and automatically creates state for each of the backup LSPs. The state is created by the MP to simulate that state which the MP would have created in response to receiving multiple individual Path messages signaling each respective bypass LSP. By sending a single message, such as an RSVP Path message, that refers to the earlier-advertised bypass tunnel identifier, the network can avoid sending a surge of RSVP Path and Resv messages immediately after link failure.

PLR router 30 receives the single Resv message from the MP router, and in response, bypass info module 56 of PLR router 30 creates backup LSP state 64, which includes the backup Resv message-IDs previously received for the protected LSPs being run over bypass tunnel 26. PLR router 30 creates the state in a manner that simulates the state which PLR router 30 would have created in response to receiving multiple individual Resv messages signaling each respective bypass LSP. PLR router 30 also sends summary refresh messages to the MP using the same Path message-IDs that PLR router 30 had previously sent to the MP router in the initial Path messages for establishing LSPs 22. PLR router 30 continues to send the summary refresh messages to the MP until RSVP-TE module 45 is informed that the protected resource has once again become operational.

PLR router 30 also includes management interface 46 by which an administrator ("ADMIN"), script, or network management system can configure PLR router 30. In some examples, management interface 46 may be presented locally, or may be used for receiving information by way of an Application Programming Interface (API) from a Software Defined Network (SDN) controller or Path Computation Element (PCE), for example.

Figure 3:
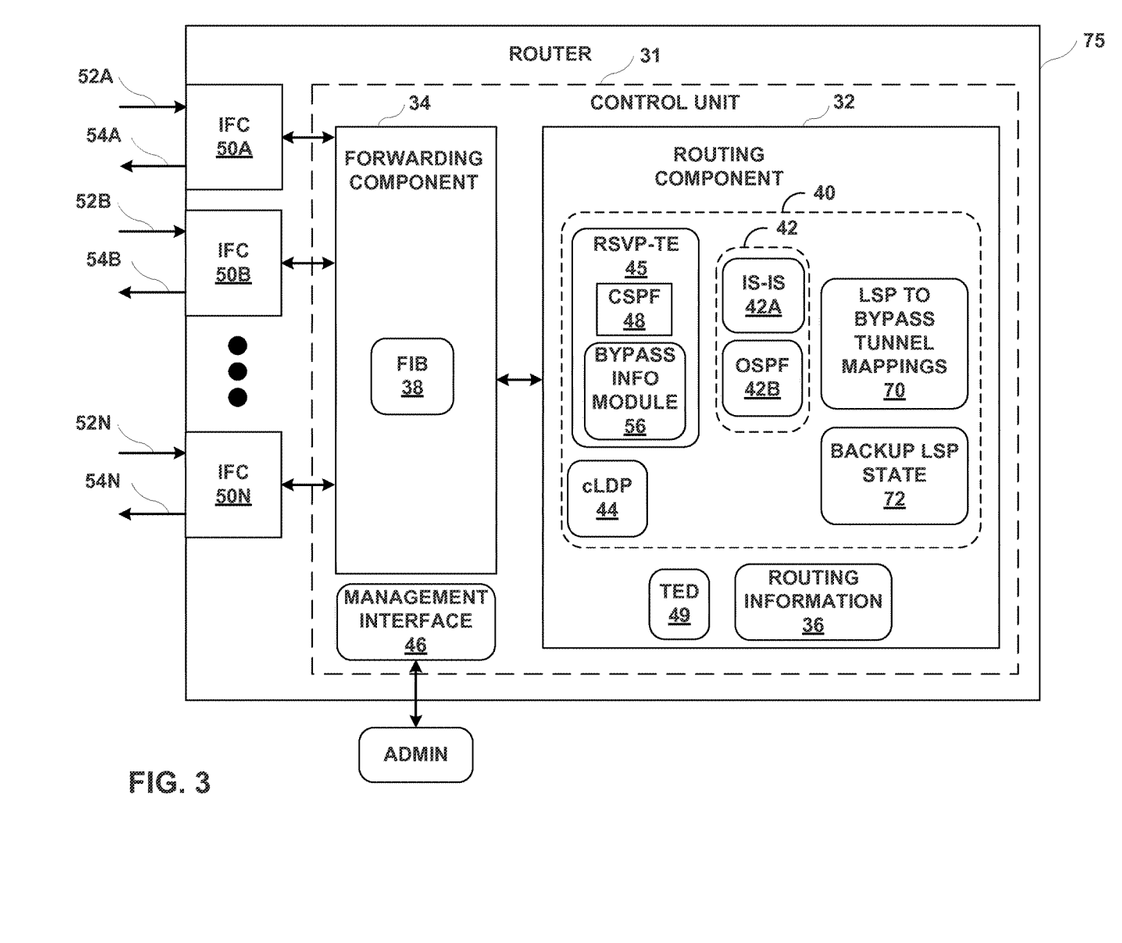
FIG. 3 is a block diagram illustrating an example embodiment of a merge point (MP) network device in accordance with the techniques of this disclosure.

FIG. 3 is a block diagram illustrating an example embodiment of a merge point (MP) network device in accordance with the techniques of this disclosure. MP router 75 may, for example, represent any of routers 12 or 16 of FIG. 1, such as MP router 16B, for example. MP router 75 includes many of the same components as described in FIG. 2, and these have similar functionality as described there. In some examples, a router may be both a PLR router and as a MP router for different bypass tunnels. In this case, the router may include components of both PLR router 30 (FIG. 2) in addition to those of MP router 75.

Upon receiving a Path message having the bypass information signaling object, bypass info module 56 stores a mapping between the bypass tunnel identifier and the LSP (e.g., as identified by the FEC specified by the RSVP-TE Path message). The Path message may also include a message-ID, which MP router 75 stores for later use in creating backup LSP state.

After a protected resource fails, MP router 75 receives a single Path message from the PLR router for triggering MP router 75 to create backup LSP state 72 for each of the backup LSPs over the bypass tunnel. The single Path message includes the assigned bypass tunnel identifier. In response to receiving this single Path message included as part of the bypass tunnel signaling, bypass info module 56 determines the bypass tunnel identifier specified by the Path message, and refers to LSP to bypass tunnel mappings 70 to determine which LSPs are associated with that bypass tunnel identifier. Bypass info module 56 automatically creates and installs backup LSP state 72 for the protected LSPs 22, and may also associated the previously-received message-IDs with the backup LSPs for use in correctly processing received summary refresh messages for backup LSPs associated with the determined LSPs.

Figure 4:
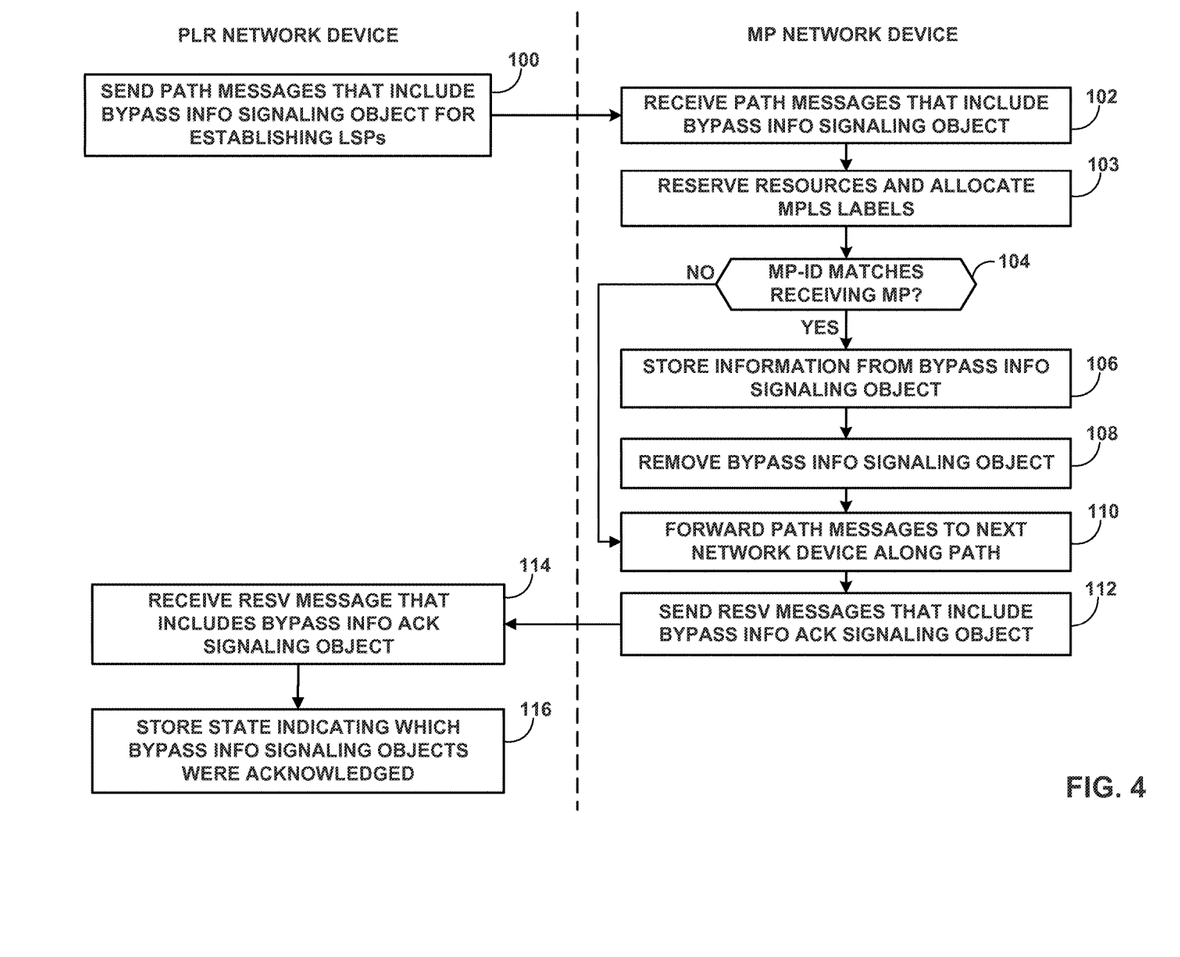
FIGS. 4 and 5 are flowcharts illustrating example operation of network devices in accordance with the techniques of this disclosure.

FIG. 4 is a flowchart illustrating example operation of network devices in accordance with the techniques of this disclosure. FIG. 4 will be described with reference to FIGS. 1-3 for purposes of example. For example, FIG. 4 refers to a PLR network device and a MP network device, which in one example may be PLR router 16A and MP router 16B of FIG. 1, respectively.

In the example of FIG. 4, for each of several LSPs, PLR router 16A sends a respective resource reservation message (e.g., an RSVP-TE Path message) for establishing the respective LSP, and each of the resource reservation messages includes a bypass information signaling object, in accordance with the techniques of this disclosure (100). The bypass information signaling object may include, for example, one or more fields specifying a bypass tunnel identifier value that identifies the bypass tunnel over which the respective LSP will be rerouted in case of failure, and may also specify an identifier of the PLR router and an identifier of the MP router. PLR router 16A assigns a bypass tunnel identifier value to each bypass tunnel for which PLR router 16A is the ingress device, and stores the bypass tunnel identifiers and an indication of the LSPs to which they are mapped to bypass tunnel identifiers 58. In some examples, the resource reservation messages also each include a respective message-ID for backup Path state with the bypass information signaling object to be used by MP router 16B in processing subsequently received summary refresh messages for a corresponding backup LSP over bypass tunnel 26.

MP router 16B receives the several resource reservation messages from PLR router 16A (102), and, for each received message, RSVP-TE module 45 of MP router 16B reserves bandwidth and allocates an MPLS label in accordance with RSVP-TE (103). Bypass info module 56 of RSVP-TE module 45 also processes the bypass information signaling object contained within each of the resource reservation messages. Bypass info module 56 is configured to understand the bypass information signaling objects and process them appropriately.

Bypass info module 56 inspects the bypass information signaling object and determines whether the merge point identifier ("MP ID") (e.g., an IP address) specified by the bypass information signaling object corresponds to MP router 16B (104). If the MP ID of the bypass information signaling object does not correspond to that of MP router 16B (NO branch of 104), RSVP-TE module 45 forwards the path message to the next network device along the path as specified by the explicit route object (ERO) of the path message (110). If the MP ID of the bypass information signaling object does correspond to that of MP router 16B (YES branch of 104), bypass info module 56 stores information from the bypass information signaling object, such as by storing to LSP to bypass tunnel mappings 70 a mapping between the LSP (e.g., as identified by the forwarding equivalence class (FEC) specified in the Path message) and the bypass tunnel identifier (106). Bypass info module 56 may also store any message-IDs included with the resource reservation request messages, with an indication of the LSPs to which the message-IDs map, for backup Path state to be created by MP router 16B and used for processing subsequently received summary refresh messages for a corresponding backup LSP over bypass tunnel 26. Bypass info module 56 then removes the bypass information signaling object from the Path message (108), and forwards the path message to the next network device along the path of the LSP, if any, according to the ERO of the Path message (110).

RSVP-TE module 45 generates and sends to PLR router 16A a resource reservation reply message (e.g., an RSVP-TE Resv message) that includes the allocated label and confirms that the requested resources have been reserved along the specified path. In accordance with the techniques of this disclosure, the Resv message also includes a bypass information acknowledgement signaling object that specifies the (bypass tunnel identifier, PLR, MP) tuple, the same as in the corresponding received bypass information signaling object for which receipt is being acknowledged (112). In some examples, the bypass information acknowledgement signaling object of each of the Resv messages also includes a respective message-ID for backup Resv state for the corresponding backup LSP that will later be established. RSVP-TE module 45 of PLR router 16A receives the Resv message with the bypass information acknowledgement signaling object (114). In some examples, bypass info module 56 of RSVP-TE module 45 may similarly check the PLR ID of the received bypass information acknowledgement signaling object to determine whether the PLR ID corresponds to PLR module 16A. If so, RSVP-TE module 45 stores the label mapping information from the received Resv message in forwarding information (e.g., FIB 38), and stores bypass-info-ack state 60 indicating which LSPs have received the bypass information acknowledgement signaling object (116).

Bypass info module 56 may also store any message-IDs that were included with the Resv messages, with an indication of the LSPs to which the message-IDs map, for later backup Resv state to be created by PLR router 16A for use in processing subsequently received summary refresh messages for a corresponding backup LSP over bypass tunnel 26. If the PLR ID of the received bypass information acknowledgement signaling object does not correspond to PLR module 16A, PLR module 16A forwards the path message to the next network device along the path of the LSP according to the ERO of the Resv message.

Figure 5:
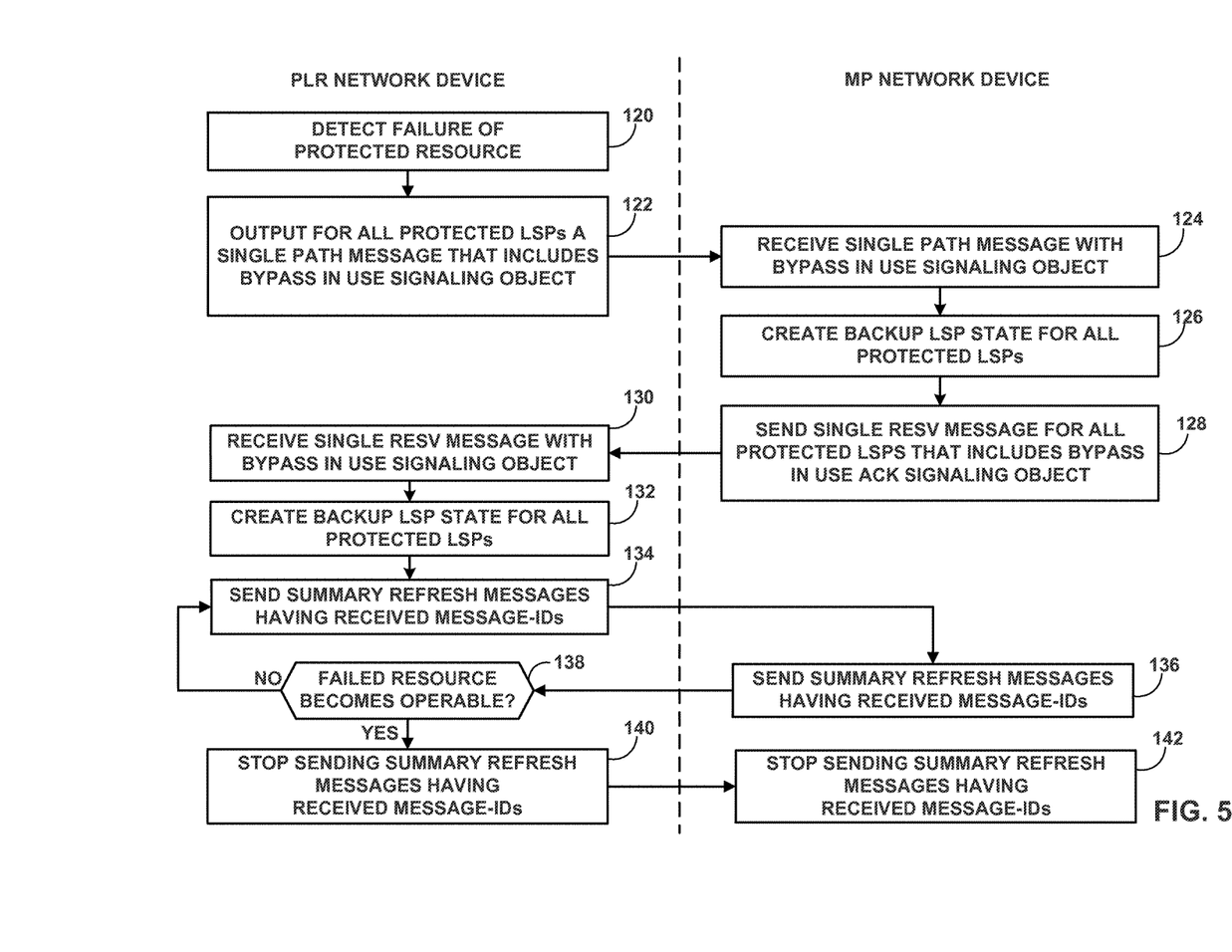

FIG. 5 is a flowchart illustrating example operation of network devices in accordance with the techniques of this disclosure. FIG. 5 will be described with reference to FIGS. 1-3 for purposes of example. For example, FIG. 5 refers to a PLR network device and a MP network device, which in one example may be PLR router 16A and MP router 16B of FIG. 1, respectively.

PLR router 16A detects a failure of a protected resource, e.g., by connectivity fault detection module 62 (120). The protected resource may be, for example, a protected link (e.g., link 20 of FIG. 1), or a protected node (e.g., a network device such as a router). In response to detecting the failure of the protected resource, RSVP-TE module 45 of PLR router 16A generates and outputs a single message (e.g., an RSVP-TE Path message as part of signaling of bypass tunnel 26) for all of the LSPs 22 for which a bypass information acknowledgement signaling object having the identifier of bypass tunnel 26 was previously received from MP router 16B (122). The single message includes a "bypass in use" signaling object that specifies the bypass tunnel identifier, to indicate to MP router 16B that bypass tunnel 26 will now be used for forwarding traffic on the protected LSPs 22 to MP router 16B.

MP router 16B receives the single message from PLR router 16A (124), and in response, bypass info module 56 of MP router 16B creates backup LSP state 72 for all of the protected LSPs associated with the bypass tunnel identifier (e.g., by referring to LSP to bypass tunnel mappings 70), which will now run over bypass tunnel 26 after failure of the protected resource (126). Bypass info module 56 also associates the previously received backup message-IDs with the respective backup LSP state. In accordance with the techniques of this disclosure, PLR router 16A can send only a single message having the bypass in use signaling object, from which the RSVP-TE module 45 of MP router 16B is configured to automatically create the backup LSP state 72 for each of the protected LSPs 22 that bypass info module 56 determines is mapped to the bypass tunnel identifier carried in the bypass in use signaling object based on LSP to bypass tunnel mappings 70.

Bypass info module 56 of MP router 16B then sends a single message for all of the protected LSPs (128) (e.g., an RSVP-TE Resv message for signaling bypass tunnel 26). The single message includes a "bypass in use" acknowledgement signaling object, which specifies the bypass tunnel identifier that was specified by the bypass in use signaling object being acknowledged. In this way, by using the bypass tunnel identifier that was previously provided by PLR router 16A to MP router 16B in the Path messages before the failure to associate the protected LSPs with bypass tunnel 26, MP router 16B is able to send only a single message to allow PLR router 16A to create backup LSP state for all of the protected LSPs that routers 16A, 16B have associated with the same bypass tunnel identifier for bypass tunnel 26. This can reduce the number of messages that routers 16 need to send and receive after a failure, and allows for greater scalability in terms of the number of LSPs that can be used in network 14 between PLR router 16A and MP router 16B. PLR router 16A receives the single Resv message from MP router 16B (130), and in response, bypass info module 56 of PLR router 16A creates backup LSP state 64 for each of the protected LSPs 22 associated with the bypass tunnel identifier (e.g., by referring to bypass tunnel identifiers 58) (132). Bypass info module 56 also includes the previously received backup Resv message-IDs as part of creating the respective backup LSP state for the protected LSPs being run over bypass tunnel 26.

PLR router 16A subsequently sends summary refresh messages to MP router 16B to refresh state for each of LSPs 22 on bypass tunnel 26, where the summary refresh messages include the backup Path message-IDs that were included in the initial Path messages sent to MP router 16B along with the bypass tunnel identifier (134). MP router 16B likewise sends summary refresh messages to PLR router 16A to refresh state for each of LSPs 22 on bypass tunnel 26, where the summary refresh messages include the backup Resv message-IDs that were included in the initial Resv messages sent to PLR router 16A along with the bypass tunnel identifier (136). PLR router 16A and MP router 16B continue to exchange summary refresh messages until PLR router 16A determines that the failed resource has become operable (or the primary path between PLR router 16A and MP router 16B is otherwise back up) (138), at which point PLR router 16A stops sending the summary refresh messages MP router 16B (140). In response to no longer receiving the summary refresh messages from PLR router 16A, MP router 16B likewise stops sending summary refresh messages to PLR router 16A (142).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
outputting, by a point of local repair network device, a plurality of resource reservation request messages for establishing a plurality of protected label switched paths (LSPs) that include a protected resource between the point of local repair network device and a common merge point network device, wherein each of the resource reservation request messages includes a common bypass tunnel identifier that identifies a common bypass tunnel that extends between the point of local repair network device and the merge point network device and avoids the protected resource;
by the point of local repair network device, detecting failure of the protected resource along the plurality of protected LSPs between the point of local repair network device and the merge point network device;
in response to detecting the failure, and by the point of local repair network device, outputting a single message over the bypass tunnel to the merge point network device to trigger creation at the merge point network device of backup LSP state information for a plurality of backup LSPs corresponding to the plurality of protected LSPs, wherein the single message includes the bypass tunnel identifier; and
outputting, by the point of local repair network device and after outputting the single message, summary refresh messages to the merge point network device to refresh state for the plurality of backup LSPs along the bypass tunnel without sending individual trigger resource reservation request messages for each of the backup LSPs.

2. The method of claim 1, further comprising:
receiving, by the point of local repair network device, a single reply message from the merge point network device in response to the single message, wherein the single reply message includes the bypass tunnel identifier that identifies the bypass tunnel; and
in response to receiving the single reply message, automatically creating, by the point of local repair network device, backup LSP state information for the plurality of backup LSPs corresponding to the plurality of protected LSPs.

3. The method of claim 1, wherein each of the plurality of resource reservation request messages includes a respective message identifier (ID) to be stored by the merge point network device for processing subsequently received summary refresh messages for the plurality of backup LSPs corresponding to the plurality of protected LSPs.

4. The method of claim 1,
wherein outputting the single message comprises outputting a single Resource Reservation Protocol with Traffic Engineering extensions (RSVP-TE) Path message to the merge point network device for signaling the bypass tunnel, and
wherein outputting the plurality of resource reservation request messages comprises outputting a plurality of Resource Reservation Protocol with Traffic Engineering extensions (RSVP-TE) Path messages to the merge point network device along a path that includes the protected resource.

5. The method of claim 1, wherein outputting a single message comprises outputting a message encapsulated with a Multi-Protocol Label Switching (MPLS) label associated with the bypass tunnel.

6. The method of claim 1, further comprising:
by the point of local repair network device, in response to determining that the protected resource has become operable, discontinuing sending the summary refresh messages for the plurality of backup LSPs.

7. The method of claim 1, further comprising:
receiving, by the point of local repair network device, a plurality of resource reservation reply messages sent by the merge point network device in response to the plurality of resource reservation request messages, wherein each of the plurality of resource reservation reply messages includes a bypass information acknowledgement signaling object that specifies the bypass tunnel identifier; and
in response to receiving the plurality of resource reservation reply messages, storing, by the point of local repair network device, information indicating the LSPs for which resource reservation reply messages with the bypass information acknowledgement signaling object have been received.

8. The method of claim 7, wherein each of the plurality of resource reservation reply messages includes a respective message identifier (ID) to be stored by the point of local repair network device for processing subsequently received summary refresh messages for the plurality of backup LSPs corresponding to the plurality of protected LSPs,
receiving, by the point of local repair network device, a single reply message for signaling the bypass tunnel from the merge point network device in response to the single message, wherein the single reply message includes the bypass tunnel identifier that identifies the bypass tunnel; and
in response to receiving the single resource reservation reply message, automatically creating, by the point of local repair network device, backup LSP state for the plurality of backup LSPs corresponding to the plurality of protected LSPs, and associating the respective message IDs received in the plurality of resource reservation reply messages with the backup LSP state.

9. The method of claim 7, further comprising: for any of the plurality of protected LSPs that the point of local repair network device has not received a resource reservation reply message with the bypass information acknowledgement signaling object, sending, in response to detecting the failure, and by the point of local repair network device, a separate trigger resource reservation request message, wherein the trigger resource reservation request message does not include a bypass information acknowledgment signaling object.

10. The method of claim 1, further comprising: assigning, by the point of local repair network device, the bypass tunnel identifier that identifies the bypass tunnel.

11. The method of claim 1, wherein the merge point network device comprises a first merge point network device, wherein the bypass tunnel comprises a first bypass tunnel, and wherein the bypass tunnel identifier comprises a first bypass tunnel identifier, the method further comprising:
sending, by the point of local repair network device, a resource reservation request message for establishing an LSP having a second merge point network device, and that will use a second bypass tunnel between the point of local repair network device and the second merge point network device; and
assigning, by the point of local repair network device, a second bypass tunnel identifier to the second bypass tunnel.

12. The method of claim 1,
wherein each of the first resource reservation request messages includes a bypass information signaling object that includes the bypass tunnel identifier that identifies the bypass tunnel, an identifier of the point of local repair network device, and an identifier of the merge point network device, and
wherein the single message includes a bypass in use signaling object that includes the bypass tunnel identifier that identifies the bypass tunnel, the identifier of the point of local repair network device, and the identifier of the merge point network device.

13. A method comprising:
receiving, by a merge point network device, a plurality of resource reservation request messages for establishing a plurality of protected label switched paths (LSPs) that include a protected resource between a common point of local repair network device and the merge point network device, wherein each of the resource reservation request messages includes a common bypass tunnel identifier that identifies a common bypass tunnel that extends between the point of local repair network device and the merge point network device and avoids the protected resource;
in response to receiving the plurality of resource reservation request messages, storing, by the merge point network device, an association between the bypass tunnel identifier and each of the plurality of protected LSPs;
outputting, by the merge point network device, a respective resource reservation response message in response to each of the plurality of resource reservation request messages, wherein each of the resource reservation response messages includes the bypass tunnel identifier that identifies the bypass tunnel, wherein each of the resource reservation response messages includes a respective message identifier (ID) to be stored by the point of local repair network device for processing subsequently received summary refresh messages for backup LSPs for the plurality of protected LSPs;
receiving, by the merge point network device, a single message over the bypass tunnel to trigger creation of backup LSP state information for a plurality of backup LSPs corresponding to the plurality of protected LSPs, wherein the single message includes the bypass tunnel identifier; and
in response to receiving the single message over the bypass tunnel, automatically creating, by the merge point network device, backup LSP state information for the plurality of backup LSPs corresponding to the plurality of protected LSPs associated with the bypass tunnel identifier according to the stored association; and
sending, by the merge point network device, summary refresh messages for each of the plurality of protected LSPs to the point of local repair network device, wherein each of the summary refresh messages includes a respective one of the message IDs included in the resource reservation response messages.

14. The method of claim 13,
wherein each of the plurality of resource reservation request messages includes a respective message identifier (ID) to be stored by the merge point network device for processing subsequently received summary refresh messages for the plurality of backup LSPs corresponding to the plurality of protected LSPs.

15. The method of claim 13, further comprising:
by the merge point network device, in response to determining that no summary refresh messages have been received from the point of local repair network device for one or more of the LSPs within a time period, discontinuing sending the summary refresh messages for the one or more LSPs.

16. The method of claim 13, further comprising: in response to receiving the single message, and by the merge point network device, sending a single reply message over the bypass tunnel that includes the bypass tunnel identifier that identifies the bypass tunnel.

17. The method of claim 13, wherein receiving the plurality of resource reservation request messages comprises receiving a plurality of Resource Reservation Protocol with Traffic Engineering extensions (RSVP-TE) Path messages, and
wherein receiving the single message comprises receiving a single RSVP-TE Path message for signaling the bypass tunnel.

18. A point of local repair network device comprising:
a hardware-based processor;
a Resource Reservation Protocol with Traffic Engineering extensions (RSVP-TE) module executing on the hardware-based processor, wherein the RSVP-TE module outputs a plurality of resource reservation request messages for establishing a plurality of protected label switched paths (LSPs) that include a protected resource between the point of local repair network device and a common merge point network device, wherein each of the resource reservation request messages includes a common bypass tunnel identifier that identifies a common bypass tunnel that extends between the point of local repair network device and the merge point network device and avoids the protected resource; and
a connectivity fault detection module that detects failure of the protected resource along the plurality of protected LSPs between the point of local repair network device and the merge point network device,
wherein in response to detecting the failure, the RSVP-TE module outputs a single message to the merge point network device over the bypass tunnel to trigger creation of backup LSP state information at the merge point network device for a plurality of backup LSPs corresponding to the plurality of protected LSPs, wherein the single message includes the bypass tunnel identifier, and
wherein, after outputting the single message, the RSVP-TE module outputs summary refresh messages to the merge point network device to refresh state for the plurality of backup LSPs along the bypass tunnel without sending individual trigger resource reservation request messages for each of the backup LSPs.

19. A merge point network device comprising:

a hardware-based processor; and a Resource Reservation Protocol with Traffic Engineering extensions (RSVP-TE) module executing on the hardware-based processor, wherein the RSVP-TE module receives a plurality of resource reservation request messages for establishing a plurality of protected label switched paths (LSPs) that include a protected resource between a common point of local repair network device and the merge point network device, wherein each of the resource reservation request messages includes a common bypass tunnel identifier that identifies a common bypass tunnel that extends between the point of local repair network device and the merge point network device and avoids the protected resource, wherein the RSVP-TE module stores an association between the bypass tunnel identifier and each of the plurality of protected LSPs, and outputs a respective resource reservation response message in response to each of the plurality of resource reservation request messages, wherein each of the resource reservation response messages includes the bypass tunnel identifier that identifies the bypass tunnel, wherein each of the resource reservation response messages includes a respective message identifier (ID) to be stored by the point of local repair network device for processing subsequently received summary refresh messages for backup LSPs for the plurality of protected LSPs, wherein the RSVP-TE module receives a single message from the point of local repair network device over the bypass tunnel to trigger creation of backup LSP state information for a plurality of backup LSPs corresponding to the plurality of protected LSPs, wherein the single message includes the bypass tunnel identifier, wherein, in response to receiving the single message over the bypass tunnel, the RSVP-TE module creates backup LSP state information for the plurality of backup LSPs corresponding to the plurality of protected LSPs associated with the bypass tunnel identifier according to the stored association, and wherein the RSVP-TE module sends summary refresh messages for each of the plurality of protected LSPs to the point of local repair network device, wherein each of the summary refresh messages includes a respective one of the message IDs included in the resource reservation response messages.

20. A computer-readable storage medium comprising instructions for causing a programmable processor to:

output a plurality of first resource reservation request messages for establishing a plurality of protected label switched paths (LSPs) that include a protected resource between the point of local repair network device and a common merge point network device, wherein each of the resource reservation request messages includes a common bypass tunnel identifier that identifies a common bypass tunnel that extends between the point of local repair network device and the merge point network device and avoids the protected resource;

detect failure of the protected resource along the plurality of protected LSPs between the point of local repair network device and the merge point network device;

in response to detecting the failure, output a single message to the merge point network device over the bypass tunnel to trigger creation at the merge point network device of backup LSP state information for a plurality of backup LSPs corresponding to the plurality of protected LSPs, wherein the single message includes the bypass tunnel identifier; and after outputting the single message, output summary refresh messages to the merge point network device to refresh state for the plurality of backup LSPs along the bypass tunnel without sending individual trigger resource reservation request messages for each of the backup LSPs.

* * * * *